Feb. 7, 1933. H. W. HARRIGAN 1,896,359
STARCH CONDITIONING MECHANISM AND TIME LAG CONTROL THEREFOR
Filed Dec. 31, 1931 3 Sheets-Sheet 3

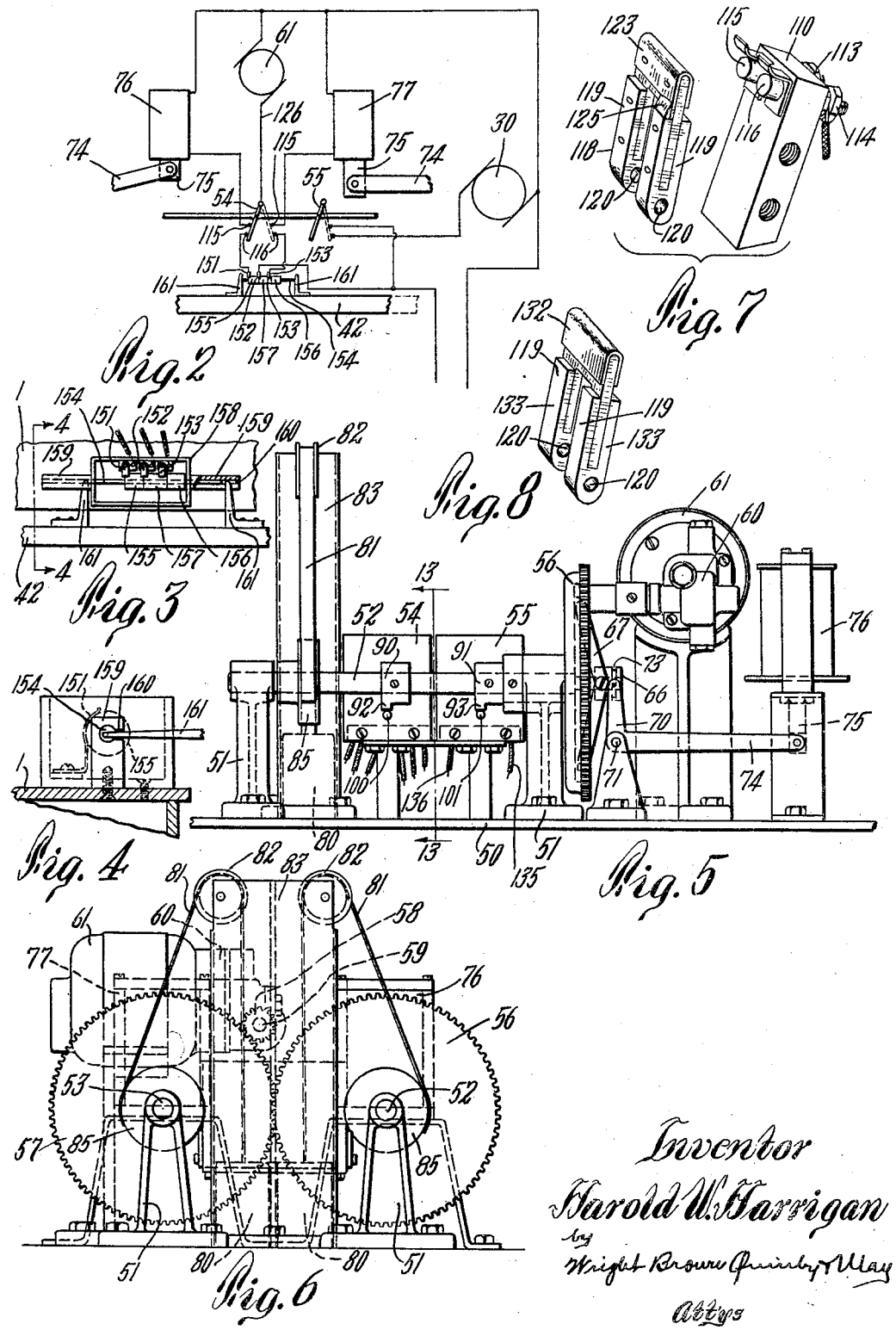

Inventor
Harold W. Harrigan
by Wright, Brown, Quinby & May
Attys

Patented Feb. 7, 1933

1,896,359

UNITED STATES PATENT OFFICE

HAROLD W. HARRIGAN, OF MELROSE, MASSACHUSETTS, ASSIGNOR TO HERSEY MANUFACTURING COMPANY, OF BOSTON, MASSACHUSETTS, A CORPORATION OF MASSACHUSETTS

STARCH CONDITIONING MECHANISM AND TIME LAG CONTROL THEREFOR

Application filed December 31, 1931. Serial No. 584,058.

In the manufacture of certain types of candy it is customary to cast the candy mixture in molds formed in starch. The starch acts not only to shape the individual candy pieces, but also absorbs a portion of the moisture contained therein. In order that the starch may be reused, therefore, it is necessary to recondition it by drying after each use, so that it may take up the desired moisture content in the subsequent molding operation. It is also desirable to clean it to remove candy particles and any foreign matter such as splinters of wood which may have become separated from the wooden trays in which the starch molds are made or which may by any chance have become mixed into the starch. Besides cleaning and drying the starch it is also important to have it at the proper temperature for the particular kind of candy being made, it being important that the starch be cold for the manufacture of marshmallows and hot for the manufacture of gums and pastes.

The casting of the candy mixture is done in a machine known either as a buck or mogul, depending on its type, and it is found in practice that when such a machine is started up it is commonly necessary to make several minor adjustments, for example, adjusting the speed of the mold board carrier to suit the spacing of the molds or the stroke of its mixture discharge pump to provide for proper size and weight of the individual candy pieces, before the machine can be started in commercial operation. These adjustments require stopping of the machine for short periods before it is in condition for steady production. It is undesirable to start and stop the starch-conditioning apparatus every time it is desired to start and stop the molding machine, but it is important that there shall be a sufficient supply of properly conditioned starch when the molding machine is to be started on a commercial run and yet that there shall never be so much starch in the conditioning mechanism as to clog it.

One feature of this invention relates to the conditioning apparatus by which the starch is delivered hot to the molding machine for the casting of candy such as gums and pastes.

A further feature of the invention relates to a control of the conditioning apparatus so that it will not start until the molding machine has been in continuous operation for a period sufficiently long to make possible all adjustments of the machine which may reasonably be expected to be necessary when it is first started up, and so that the conditioning mechanism will continue to operate after it has once been started until after the molding machine has been continuously idle for a predetermined period.

For a more complete understanding of this invention reference may be had to the accompanying drawings in which Figure 1 is a somewhat diagrammatic elevation of the molding and conditioning apparatus and the controls therefor.

Figure 2 is a diagram showing the motor for driving the conditioning apparatus stopped, but the molding machine control in running condition.

Figure 3 is a fragmentary view partly in plan and partly in section showing a control switch and its actuator.

Figure 4 is a detail section on line 4—4 of Figure 3.

Figure 5 is a side elevation of the lag control mechanism.

Figure 6 is a left end elevation of the same.

Figure 7 is a perspective showing certain switch parts detached.

Figure 8 is a similar view of the movable element of another switch.

Figure 1:
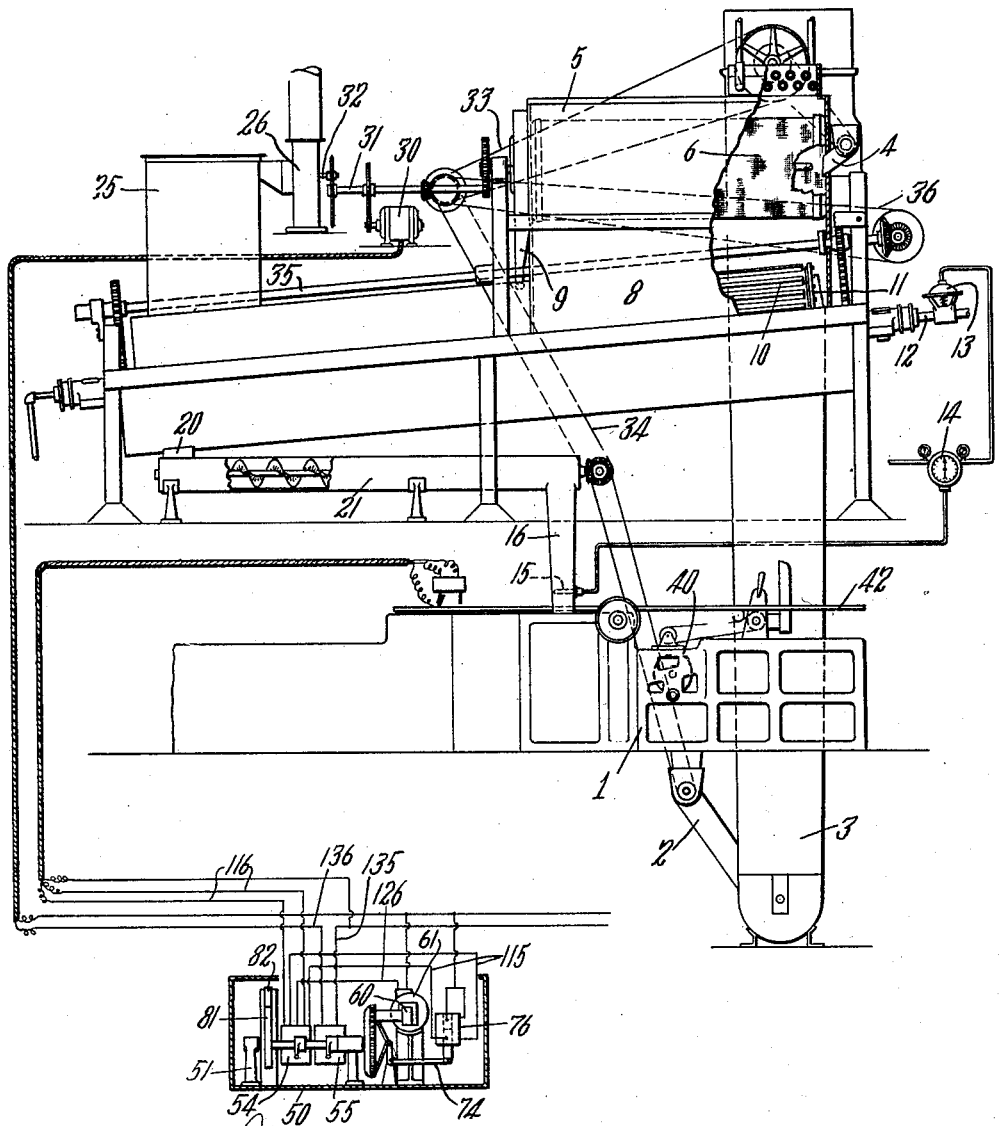

Referring first to Figure 1, the starch molding machine is indicated diagrammatically at 1. Used starch passes therefrom through the chute 2 into the conveyor 3 from the upper end of which it is discharged through the chute 4 into a cleaner at 5. This cleaner, as shown, is provided with a rotary screen 6 into which the starch to be cleaned and conditioned is delivered from the chute 4. The tailings pass out through a chute 9. Above the cleaner is positioned an air preheater 7.

After passing through the screen 6, the starch drops into a drier 8. This drier may be of any suitable type but as shown is provided with a plurality of longitudinally extending pipes 10 carried by a rotary cage 11, these pipes being supplied with steam through a pipe 12. The steam supply to the pipe 12 is controlled through a diaphragm valve 13 by a temperature control mechanism 14 actuated by a thermal element 15 located in the passage 16 from which the conditioned starch is returned to the molding machine 1. As shown the drier 8 is inclined so as to cause the starch as it becomes dried to pass downwardly therein until it is discharged at its lower end as through the pipe 20 into the conveyor 21 by which it is conveyed to the discharge 16.

At 25 is shown a dust collector connected to an exhaust fan 26 by which air is drawn through the preheater 7, through the cleaner 5, and then through the drier 8. It passes through the drier 8 in the same direction as the flow of starch therethrough. By this means the starch is delivered to the molding machine at proper conditions of humidity and temperature. Ordinarily for gum and paste work, temperatures from 140° to 175° F. are desired.

The screen 6, the drier 8, conveyor 3, the conveyor 21 and the blower 26, as shown, are all driven by a motor 30. As shown this motor 30 drives a main shaft 31 which is geared to the blower shaft 32 and which drives the conveyor 3 through the belt connection 33 and the conveyor 21 through the belt connection 34. The drier drum is rotated by geared connections to an actuating shaft 35 and this is driven through a belt connection 36 from the main shaft 31. The molding machine is also driven, but by a separate drive mechanism such as the motor 40, which may be clutched or unclutched to the drier as by the shifting of a clutch bar 42. The shifting of this clutch bar in opposite directions acts through a lag control mechanism shown in detail in Figures 3 to 13 to start or stop the motor 30 but only after a predetermined extent of continuous operation or a continuous period of idleness, respectively, of the molding machine, each of predetermined extent.

This lag control mechanism is shown somewhat diagrammatically in Figures 1 and 2. It comprises a base 50 having four bearing members 51 for supporting a pair of shafts 52 and 53 in parallel relation. Between these shafts are positioned two switch mechanisms 54 and 55. Each of these shafts 52 and 53 has loosely mounted thereon at one end clutch elements 56 and 57, respectively, whose peripheries are formed as gears which intermesh as shown best in Figure 6, so that they are driven simultaneously and in opposite directions. A pinion 58 meshing with one of the loose clutch elements as 57 is carried by a shaft 59 which is connected through suitable reduction gearing 60 with a motor 61 which may be termed the lag motor. It drives the loose clutch elements at a relatively low rate of speed so as to provide for the desired time lag between the actuation of the motor 30 and the shifting of the clutch bar 42. Each of the shafts 52 and 53 is also provided with a fixed clutch element one of which is shown at 65 in Figure 9. As shown this clutch element is provided with a central collar portion 66 slidable axially of its shaft but keyed thereto, and extending from the collar 66 are the toggle links 67 which act when the collar 66 is moved toward the mating loose clutch to clutch the fixed element thereto thus to cause the rotation of the lag motor 61 to turn the corresponding shaft 52 or 53. The axial movement of each of the fixed clutch elements is produced through a bell crank lever 70 fulcrumed at 71 and having an arm 72 provided with fork lugs riding in a groove 73 of the clutch collar 66. An arm 74 of each bell crank lever 70 is connected to the core 75 of one or the other of a pair of solenoids 76 and 77, the solenoid 76 when energized acting to couple the shaft 52 for rotation by the motor 61 and the solenoid 77 when energized coupling the shaft 53 for rotation. Each of these shafts is normally held in a predetermined angular position as by means of a weight 80 connected to a flexible band 81, which passes about a guide pulley 82 at the upper end of a support 83 and then passes down and is secured to the periphery of a drum 85 fixed on each shaft 52 or 53. Thus whenever either of these shafts is freed from clutching engagement with the motor 61, it is immediately returned by its weight 80 to this predetermined angular position. The shaft 52 carries thereon a pair of cam collars 90 and 91 having cam projections 92 and 93, respectively, thereon. The shaft 53 is provided with similar cam collars, one of these being shown at 94, provided with a projection 95. The cam projections on the cams of the two shafts 52 and 53 are oppositely facing and when these shafts are in their predetermined angular positions to which they are individually held by their respective weights 80 the cam projections are out of operative relation to actuate bars 100 and 101, respectively, of the switches 54 and 55, but after rotation of either shaft to a predetermined angular extent against the action of its weight 80, its cam projections are brought into operative relation with the two actuating bars 100 and 101 which are alined with the cams to move them axially from one to the other of two positions.

Figure 9:
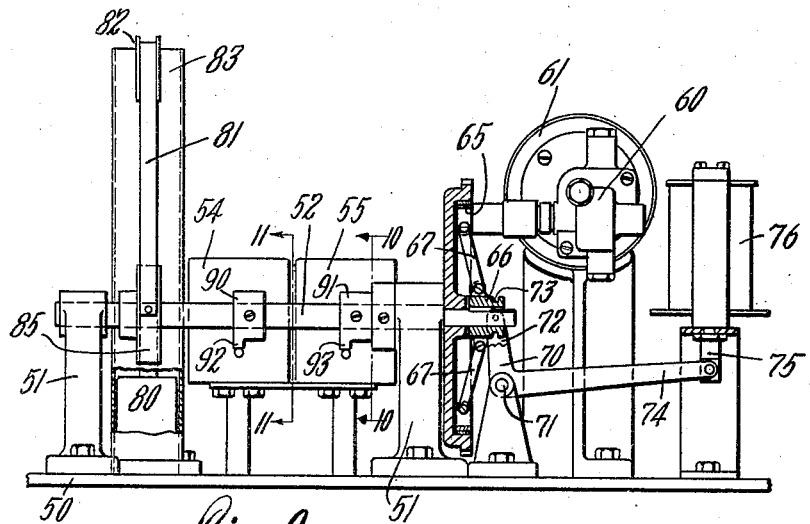
Figure 9 is a view somewhat similar to Figure 5, but partly in section.
Figures 10, 11:
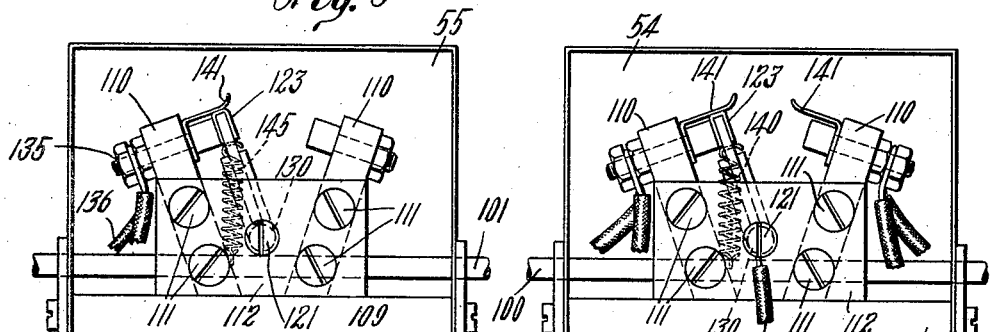
Figure 10 is a detail section on line 10—10 of Figure 9.
Figures 11 and 12 are sections on lines 11—11 of Figure 9 but showing the switch arms in reverse positions.
Figure 13:
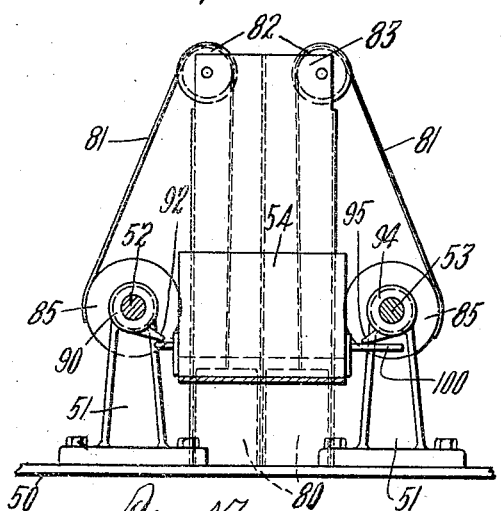
Figure 13 is a section on line 13—13 of Figure 5.
Figure 12:
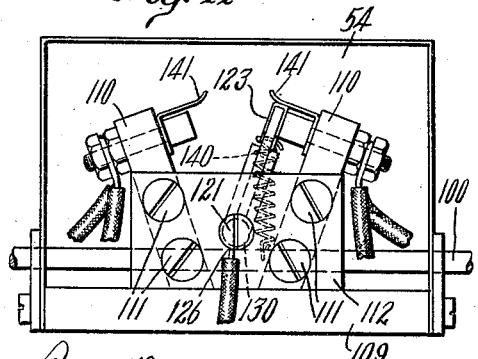

The switch 54 is shown in its two positions in Figures 11 and 12, respectively, and certain of its actuating parts are shown in Figure 7. Referring to these Figures, it will be seen that this switch comprises a pair of angularly disposed insulating supports 110 which are secured as by screws 111 to end supporting blocks 112 carried by a base 109. The upper end portion of each of the supports 110 has fixed therein a pair of terminals 113 and 114 in electrical connection through the support with contacts 115 and 116, respectively. Between these supports 110 is pivotally carried a switch arm 118. This switch arm as shown comprises two forked metal pieces 119 having holes 120 adjacent to their closed ends for receiving a suitable pivot as at 121 (see Figures 11 and 12). Between the forked portions are supported a U-shaped insulating piece 122, the cross member of the U supporting a U-shaped strip of metal as at 123 which may be riveted to the insulating piece 122. One end of the piece 123 may be placed into electrical connection with one of the members 119 as by soldering at 125. It will be seen that when this switch arm is against either of the sets of contacts 115, 116 it not only places these in electrical connection with each other but also places both in electrical connection with one of the elements 119 and thus with its supporting pivot to one end of which may be secured a wire as at 126. The switch 55 is somewhat similar to the switch 54, except that the electrical connection between the contacts and the pivot shaft 130 is omitted, there being no connection between the metallic portion 132 of the switch arm and either pivoted U-shaped support 133 and only one of the supports 110, shown as the left hand support in Figure 10, is provided with connections to terminals, one of which is shown at 135. The other support 110 serves merely as a stop to limit the pivotal motion of the pivotal switch member in one direction. The axially movable bar 100 of the switch 54 is connected to its switch arms by means of the spring 140 which passes across the pivotal center 121 of the switch arm when the bar 100 is moved from one of its extreme positions to the other so as to produce a snap switch effect, snapping the switch arm away from one set of contacts and into engagement with the other. Spring members 141 act to hold the movable blade in position until the spring 140 is tensioned sufficiently to throw it quickly to the other set of contacts, thus to produce a quick make and break snap effect and they also act to produce a wiping contact with the portion 132 which reduces arcing. The switch 54 is thus a double pole double throw switch. The switch 55 is merely a make and break switch, its switch arm being connected to the bar 101 by the spring 145, and when in position to engage the left hand contacts, as shown in Figure 9, the circuit is made between the contacts 135 and 136 (see Figure 2) and when the switch arm is thrown in the opposite direction the circuit is open.

As shown best in Figure 2, the switch 55 makes and breaks the circuit to the motor 30, thus stopping and starting the motion of the conditioning mechanism. The switch 54 has its wire 126 connected to one side of the lag control motor 61. The contacts 115 and 116 are connected, respectively, to one side of a double throw control switch at 150 actuated by reciprocation of the clutch bar 42, and to the solenoid 76. The right hand contacts 115 and 116 are connected, respectively, to the other solenoid 77 and to the other side of the switch 150. The clutch bar 42 being in the position shown in Figure 2 in full lines and with the switches 54 and 55 in full line position, the switch 55 being in open position, the lag control motor 61 is energized. The energization of the solenoid 76 acts to clutch the shaft 52 for rotation by the motor 61 and this condition persists until such time as the shaft 52 has been rotated sufficiently to actuate the bars 100 and 101, throwing the switches 54 and 55 to the dotted line positions shown in Figure 2. This action interrupts the current through the solenoid 76 and the motor 61, whereupon one of the weights 80 returns the shaft 52 to its original inoperative angular position shown in Figure 13, but the throwing of the bar 101 makes connection between the contacts 135 and 136 so as to start the motor 30, which thus starts the operation of the conditioning mechanism. If at any time prior to the shaft 52 reaching such an angular position as to throw the bars 100 and 101, the control bar 42 be moved in the opposite direction to stop the molding machine operation, the flow of energy to the solenoid 76 and the lag motor 61 is interrupted, and the weight 80 returns the shaft 52 to its original position. It will thus be evident that it is necessary that the control bar 42 remain in molding machine operative condition uninterruptedly for a definite length of time before the motor 30 will be energized. After the switches 54 and 55 have been moved to the dotted line position in Figure 2, the motor 30 being thus started, this motor continues to operate until such time as the control bar 42 has been moved to stop the molding machine. When this is done this switch 152 is in the dotted line position shown in Figure 2 and the switches 54 and 55 are also in their dotted line positions. This permits the motor 61 to start turning and also energizes the solenoid 77. This clutches the shaft 53 for rotation by the motor 61 and if the bar 42 remains in this position long enough, this motion proceeds uninterruptedly until such time as the cams on the shaft 53 have thrown the bars 100 and 101 to their opposite lengthwise positions, returning the switches 54 and 55 to the full line position shown in Figure 2. The return of the switch 55 opens the circuit to the motor 30 which immediately stops so that the conditioning mechanism stops. The return of the switch 54 conditions the parts as shown in full lines in Figure 2 so that when the control bar 42 is moved to again start the molding mechanism, the solenoid 76 will become energized and the motor 61 will be started. If the control bar 42 does not remain in stopped position sufficiently long for the rotation of the shaft 53 to throw the switches 54 and 55, its weight 80 returns the shaft immediately to its predetermined angular position from which it must be turned the complete angular distance before the switches 54 and 55 are thrown. Thus at the same time that the motor 30 is started or stopped the connections are automatically made so that the proper time control element will be set into operation on reverse direction of motion of the control bar to reverse the control switch for the motor 30.

In Figures 3 and 4 are shown one form of switch 150. As therein shown this switch has three stationary contacts 151, 152, 153. The central contact 152 is connected to one side of the power supply, the contact 151 is connected to the left hand contact 116, and the contact 153 is connected to the right hand contact 116. Slidable past these contacts is a bar 154 having a pair of conducting sleeves 155 and 156 thereon spaced by a non-conducting portion 157. The sleeves 155 and 156 are of sufficient length to bridge a pair of the contacts 151, 152 and 153 but not all three. In the position shown in Figure 3 the sleeve 155 is shown bridging the left hand contact 151 and the central contact 152, thus forming the connections shown in full lines in Figure 2. These contacts 151, 152, 153 are enclosed in a switch casing 158 through which the bar 154 extends into a pair of housings 159. Each of these housings has a slot extending into one face as at 160 through which extend fingers 161 carried by the clutch bar 42 so that as the clutch bar is moved these fingers throw the contacting sleeves 155 and 156 to make the desired connections. The housings 159 prevent interference with the engagement of the fingers 161 with the ends of the bar 154 and also prevent accidental movement of the bar 154. Generic claims to the lag control per se and to its application to starch conditioning apparatus are contained in my Patent No. 1,872,284 granted August 16, 1932, for Method of and mechanism for conditioning starch.

From the foregoing description of an embodiment of this invention, it should be evident to those skilled in the art that various changes and modifications might be made without departing from the spirit or scope of this invention as defined by the appended claims.

I claim:

1. A starch conditioning apparatus comprising a cleaner, means for introducing starch material to be conditioned into said cleaner, a drier for receiving cleaned material from said cleaner, an air heater, and means for passing air through said heater, then through said cleaner, and then through said drier.

2. A starch conditioning apparatus comprising a cleaner, means for introducing starch material to be conditioned into said cleaner, a drier for receiving cleaned material from said cleaner, heating means in said drier, an air heater, and means for passing air through said heater, then through said cleaner, and then through said drier.

3. A starch conditioning apparatus comprising a cleaner, means for introducing starch material to be conditioned into said cleaner, a drier for receiving cleaned material from said cleaner, heating means in said drier, an air heater, and means for passing air through said heater, then through said cleaner, and then through said drier in the direction of passage of the material through said drier.

4. In combination, a pair of spaced rotary shafts, a cam on each shaft, an axially movable bar positioned between said shafts in alinement with said cams to be reciprocated in opposite directions thereby, means actuable to rotate either of said shafts, and an electric switch actuated by the reciprocation of said bar.

5. In combination, a pair of spaced rotary shafts, a cam on each shaft, an axially movable bar positioned between said shafts in alinement with said cams to be reciprocated in opposite directions thereby, means actuable to rotate either of said shafts, means tending to hold each shaft in an angular position with its cam inoperative, and an electric switch actuated by the reciprocation of said bar.

6. In combination, a pair of spaced rotary shafts, a clutch element fixed to each shaft, a mating clutch element loose on each shaft, said loose elements being coupled for simultaneous rotation, a cam on each shaft, an axially movable bar positioned between said shafts in alinement with said cams to be moved in one direction by one of said cams and in the opposite direction by the other of said cams, means for driving said loose clutch elements, means for clutching or unclutching either of said pairs of fixed and loose clutch elements, means yieldingly holding each shaft in an angular position with its cam inoperative, and a switch actuated by axial movement of said bar.

7. In combination, a pair of spaced rotary shafts, a clutch element fixed to each shaft, a mating clutch element loose on each shaft, means actuable to drive both of said loose clutch elements, a machine starting and stopping mechanism, means actuated on rotation of one of said shafts through engagement of its clutch elements through a predetermined angular extent from one position to actuate said mechanism to start the machine, means actuated by the rotation of the other of said shafts from one position through a predetermined angular extent by engagement of its clutch elements to actuate said mechanism to stop the machine, means for returning each of said shafts to its one position on unclutching of its clutch elements, means actuable to close or open said sets of clutch elements one at a time, and means for preventing the closing of each set of clutch elements except when rotation of its shaft would act to reverse the condition of said mechanism.

8. In combination, a pair of spaced rotary shafts, a clutch element fixed to each shaft, a mating clutch element loose on each shaft, means actuable to drive both of said loose clutch elements, a machine starting and stopping mechanism, means actuated on rotation of one of said shafts through engagement of its clutch elements through a predetermined angular extent from one position to actuate said mechanism to start the machine, means actuated by the rotation of the other of said shafts from one position through a predetermined angular extent by engagement of its clutch elements to actuate said mechanism to stop the machine, means for returning each of said shafts to its one position on unclutching of its clutch elements, means actuable to close or open said sets of clutch elements one at a time, means for preventing the closing of each set of clutch elements except when rotation of its shaft would act to reverse the condition of said mechanism, and means actuable on the actuation of said mechanism by the rotation of one of said shafts to stop said driving means and to condition said driving means for starting only when the other set of clutch elements are closed.

9. In combination, a pair of spaced rotary shafts, a clutch element fixed to each shaft, a mating clutch element loose on each shaft, a motor for driving said loose clutch elements, a solenoid for closing each pair of mating clutch elements to connect one or the other of said shafts for rotation by said motor, means for yieldingly holding each shaft in a predetermined angular position from which it is turned by said motor when its clutch elements are closed, a pair of electric switches, cams on said shafts, those on one shaft actuating said switches in one direction and those on the other shaft actuating said switches in the reverse direction but only after a predetermined extent of rotation of their respective shafts away from said predetermined angular positions, and a double throw control switch, one of said shaft-actuated switches being a power circuit control switch closed by rotation of one of said shafts and opened by rotation of the other of said shafts, and the other of said shaft-actuated switches being a double throw switch closing a circuit through one or the other side of said control switch, said motor and that solenoid which when energized clutches that shaft to said motor which by its rotation reverses the position of said shaft-actuated double throw switch to connect said motor and the other of said solenoids to the other side of said control switch.

10. In combination, a movable member, spaced lugs extending from said member, a switch having a reciprocable actuating bar between said lugs, a casing enclosing said switch and from which the ends of said bar project, and a housing extending from said switch casing and enclosing each of said bar ends and having a slot therein to receive one of said lugs.

11. In combination, a pair of rotary shafts, a clutch element fixed to each shaft, a mating clutch element loose on each shaft, means actuable to drive both of said loose clutch elements, a mechanism, means actuated on rotation of one of said shafts through a predetermined angular extent from one position to actuate said mechanism in one relation, means actuated on the rotation of the other of said shafts through a predetermined angular extent from one position to actuate said mechanism in the reversed relation, means tending to return and hold each shaft in its respective one angular position, and means actuable to connect either of said loose clutch elements in clutching relation to its fixed clutch element.

In testimony whereof I have affixed my signature.

HAROLD W. HARRIGAN.